United States Patent [19]
Ortiz

[11] 3,724,662
[45] Apr. 3, 1973

[54] CONTROL OF OIL POLLUTION AT SEA, APPARATUS AND METHOD

[76] Inventor: Angel J. Ortiz, Calle Rio Guadalquivir No. 30, Mexico City, Mexico

[22] Filed: Mar. 12, 1971

[21] Appl. No.: 123,779

[52] U.S. Cl. ................................210/83, 210/242
[51] Int. Cl. ..............................................B01d 21/00
[58] Field of Search.........210/83, 242, DIG. 21; 61/1

[56] References Cited

UNITED STATES PATENTS

| | | | |
|---|---|---|---|
| 3,653,215 | 4/1972 | Crucet | 61/1 |
| 3,389,559 | 6/1968 | Logan | 210/DIG. 21 |
| 3,469,402 | 9/1969 | Lowd | 210/DIG. 21 |
| 3,500,841 | 3/1970 | Logan | 210/DIG. 21 |
| 3,548,605 | 12/1970 | Paull et al. | 210/DIG. 21 |
| 3,567,019 | 3/1971 | Headrick | 210/DIG. 21 |

*Primary Examiner*—Reuben Friedman
*Assistant Examiner*—T. A. Granger
*Attorney*—Cushman, Darby & Cushman et al.

[57] ABSTRACT

Massive oil spills from tankers or offshore wells and small spills from bottom crevices are eliminated by confining the oil right at the spill source, before it becomes a slick, by means of a marine pollution control system which includes a huge plastic bag from which oil is pumped from the bag to a receiving facility. The marine pollution control system, also referred to as <MPCS>, is a preventive and contingency constituting a complete, self-contained, light and mobile system of men and equipment that can be deployed on very short notice for oil spill containment anywhere in the world.

26 Claims, 12 Drawing Figures

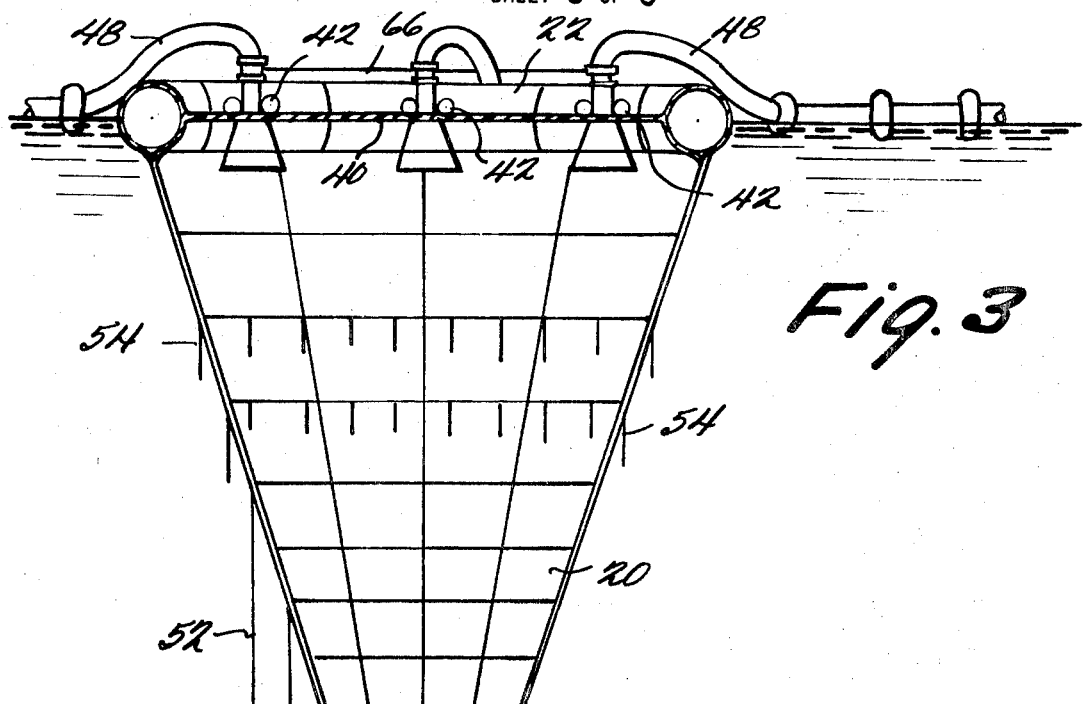
Fig. 3
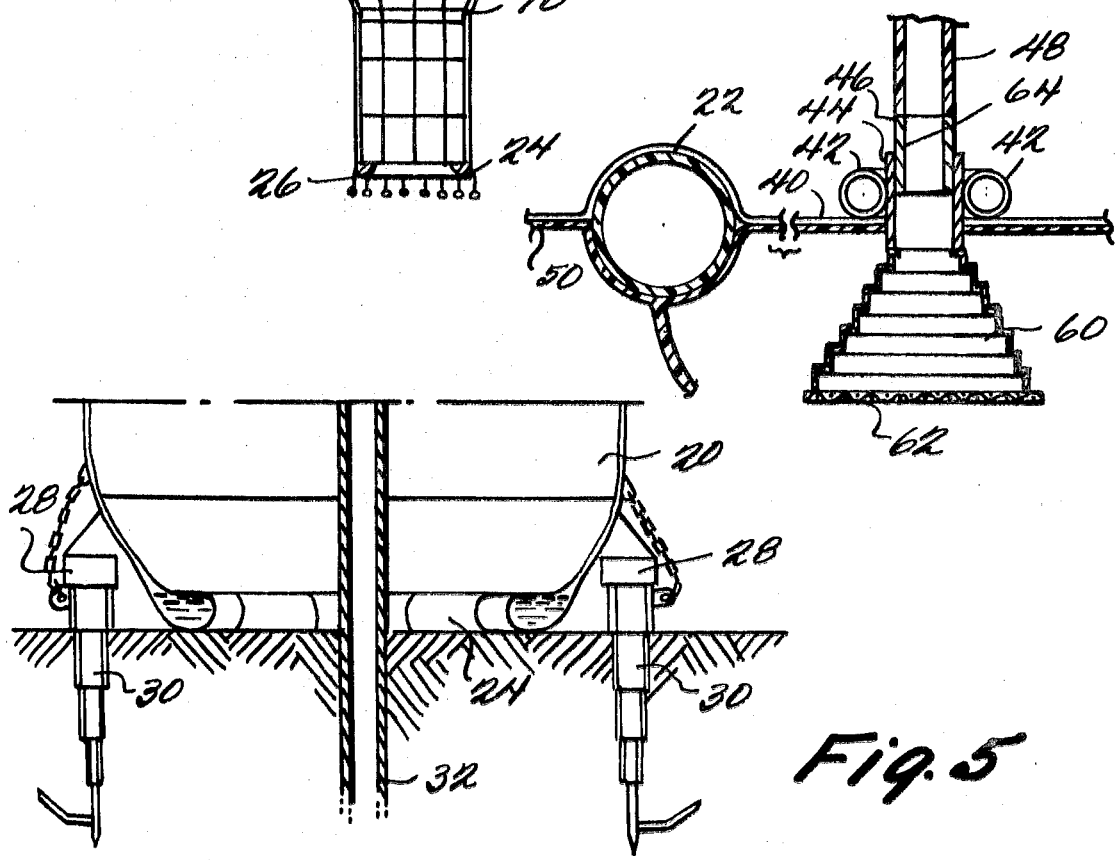
Fig. 4
Fig. 5

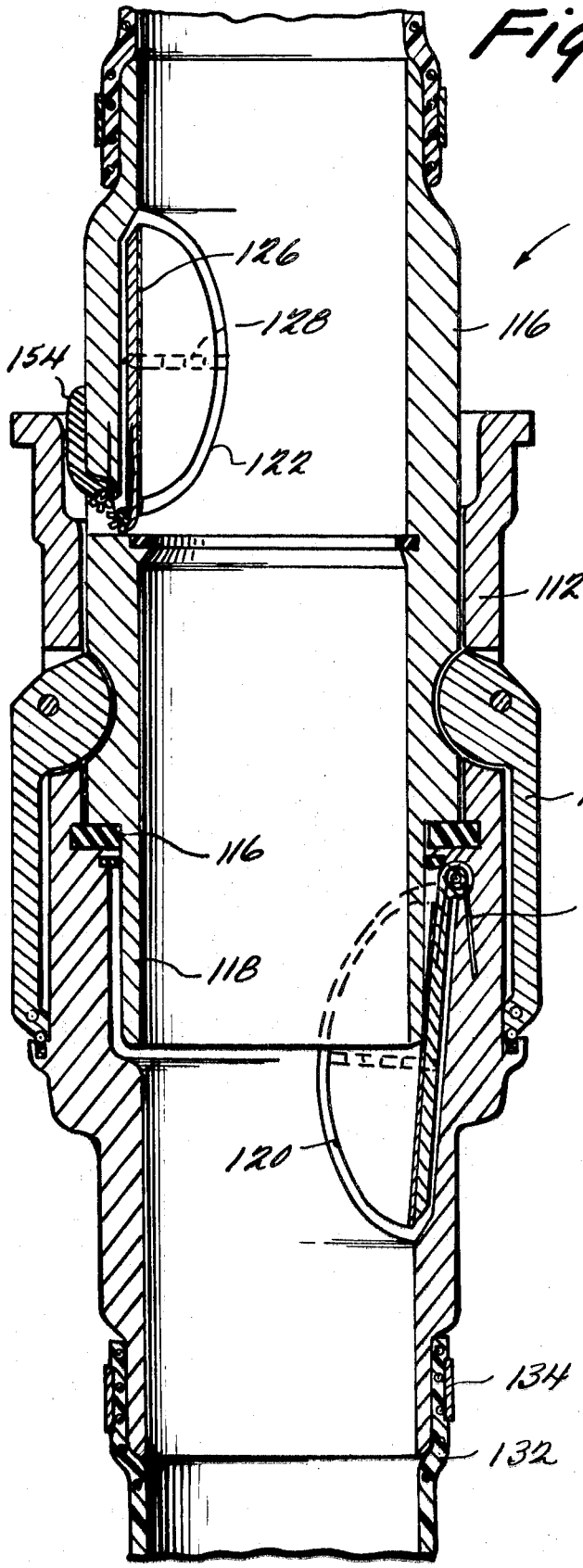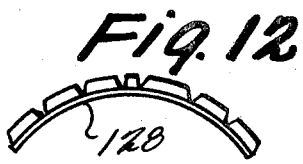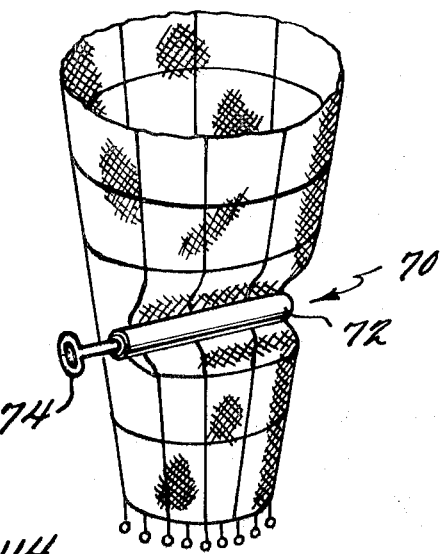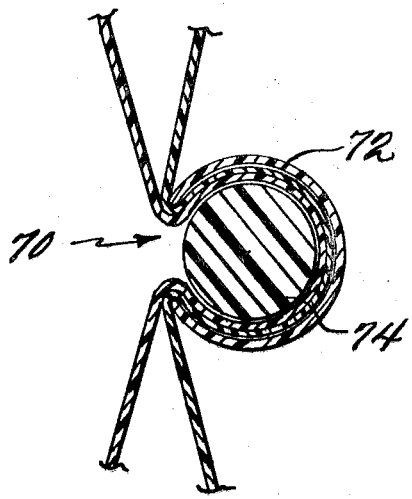

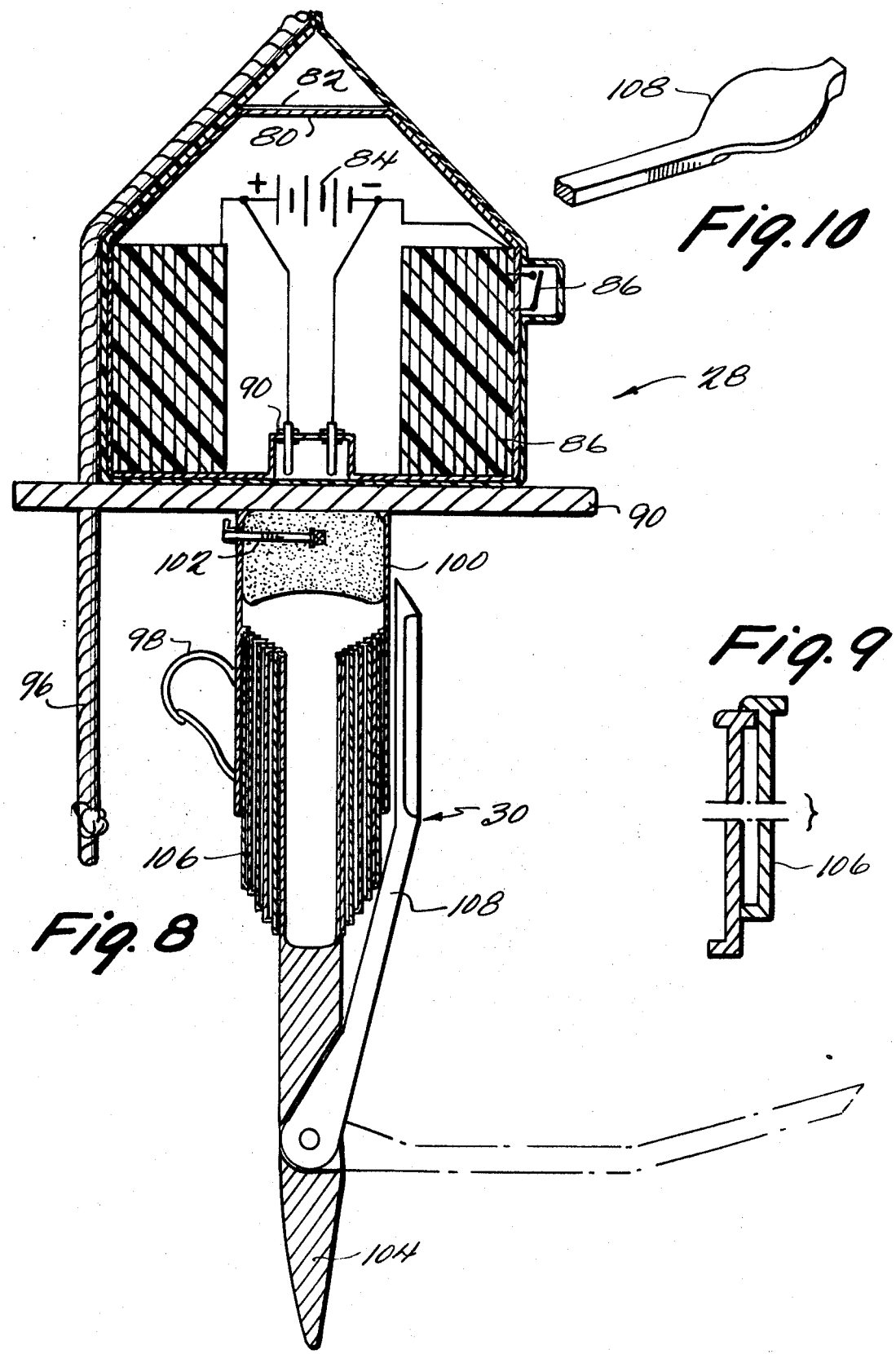

CONTROL OF OIL POLLUTION AT SEA, APPARATUS AND METHOD

SUMMARY

Marine pollution control system <MPCS> is designed to prevent oil slicks originating either from massive oil spills from tankers and drilling operations or from small oil seepages emanating from crevices on the ocean floor, or from underwater pipelines.

The oil slick is controlled and finally eliminated by confining oil right at the source of the spill and then pumping it to a safe destination. This is accomplished by the use of a huge plastic bag placed under the water with the mouth around the offending crevice or crack and with the other end, which is floating on the surface of the water, discharging oil through pump suction connections. The bag is of an inverted tear-drop shape; the small end which is open is the mouth and the large end which is closed, except for hose connections, is the roof. When the mouth has been placed on the offending ship's hull, pipeline or the ocean floor around the spill, and the pump suction hoses have been connected to the roof by means of "quick-release" suction couplings the system has started its oil confining and recovering function. Oil flows from the source into the bag and from there it is pumped to its final destination.

The oil spilling from an underwater crevice or from a crack in the containing vessel flows into the plastic bag and upwards toward the discharging end by virtue of its buoyancy and by the kinetic energy imparted to it by the oil source which is generally at a higher relative pressure.

In the case of oil spilling from a tanker, this higher relative pressure is attained by pumping an air bubble into the ship's hold. Once oil becomes confined within the bag and has reached the hose connections at the roof, pumping starts through positive displacement high capacity pumps mounted on boats stationed aside and around the bag. The pumps discharge oil to barges or tankers for transport or directly to the refinery for dewatering and processing.

The plastic bag rolls from its pre-folded position off a bag boat and is pulled underwater by frogmen and by the weight of its mouth anchors and appurtenances. Water is not allowed to enter the body of the bag during its descent because it is sealed several feet above the mouth at an area known as the throat. This design however permits entrance of water into the lower part of the bag for the purpose of shaping the mouth area and of preventing its collapse during the mouth placing operation. Once the mouth has been positioned on the ocean floor or on the ship's hull and properly anchored thereon, the seal at the throat is released and oil is then allowed to flow into the body of the bag and to ascent to the roof. Meanwhile, the roof has fallen on the water and has stretched out into a circular shape by a neoprene roof ring which is inflated from small self-contained pressurized nitrogen bottles integral to the roof. In addition to forming the roof's structure the nitrogen inflated ring serves to protect the bag and clearly identify the periphery of the bag area.

<MPCS> is also designed to kill blown-out wild wells, gas or oil, either underwater or on land, automatically and in a very short time.

Although this invention will be further described with reference to containment of underwater oil leakages at sea, it is to be understood that the system, and method of operating the system, can be used in other bodies of water and in applications involving containment and collection of other fluid flows, such as untreated industrial wastes or other polluting fluids, that might be found in water environments which are to be protected from contamination. These and other features and advantages of the present invention will be discussed in greater detail below with reference to the accompanying drawings briefly described below.

DESCRIPTION OF DRAWINGS

FIG. 3 is an elevational view (partly in section) of a flexible bag means, and associated structures, of the system with a roof section of the flexible bag means floating on the surface of a body of water and with suction hoses connected therethrough for removing oil or other fluid from an interior space of the flexible bag means.

FIG. 4 is an enlarged sectional view of a portion of the roof section, and an associated hose connection means, of the system of FIG. 3.

FIG. 5 is an enlarged sectional view or an open mouth portion of the flexible bag means of FIG. 3 with separate anchoring means installed and with a ring means of the open mouth ballasted to provide a substantially sealed relationship between the open mouth and a sea bottom area.

FIG. 6 is an isometric view of a lower throat portion of the flexible bag means of this invention, showing a removable seal means in place for closing off a major portion of the interior space of the flexible bag means during its deployment.

FIG. 7 is an enlarged sectional view, as seen on line 7—7 of FIG. 6, showing constructional features and relationships of the removable seal means.

FIG. 8 is an enlarged elevational view, in section, of an anchor block and separate anchoring means for fastening the open mouth portion of the flexible bag means in a preferred position over a bottom area of a body of water.

FIG. 9 is an enlarged sectional view of a portion of the telescoping shank of the separate anchoring means of FIG. 8.

FIG. 10 is an isometric view, in reduced scale, of a rebatable arm portion of the separate anchoring means of FIG. 8.

FIG. 11 is an enlarged elevational view, in section, of a hose connection means and quick release coupling used for connecting hoses through the roof section of the flexible bag means of this invention.

FIG. 12 is a horizontal section through a check valve structure of the FIG. 11 hose connection means.

DETAILED DESCRIPTION OF INVENTION

Figure 1:
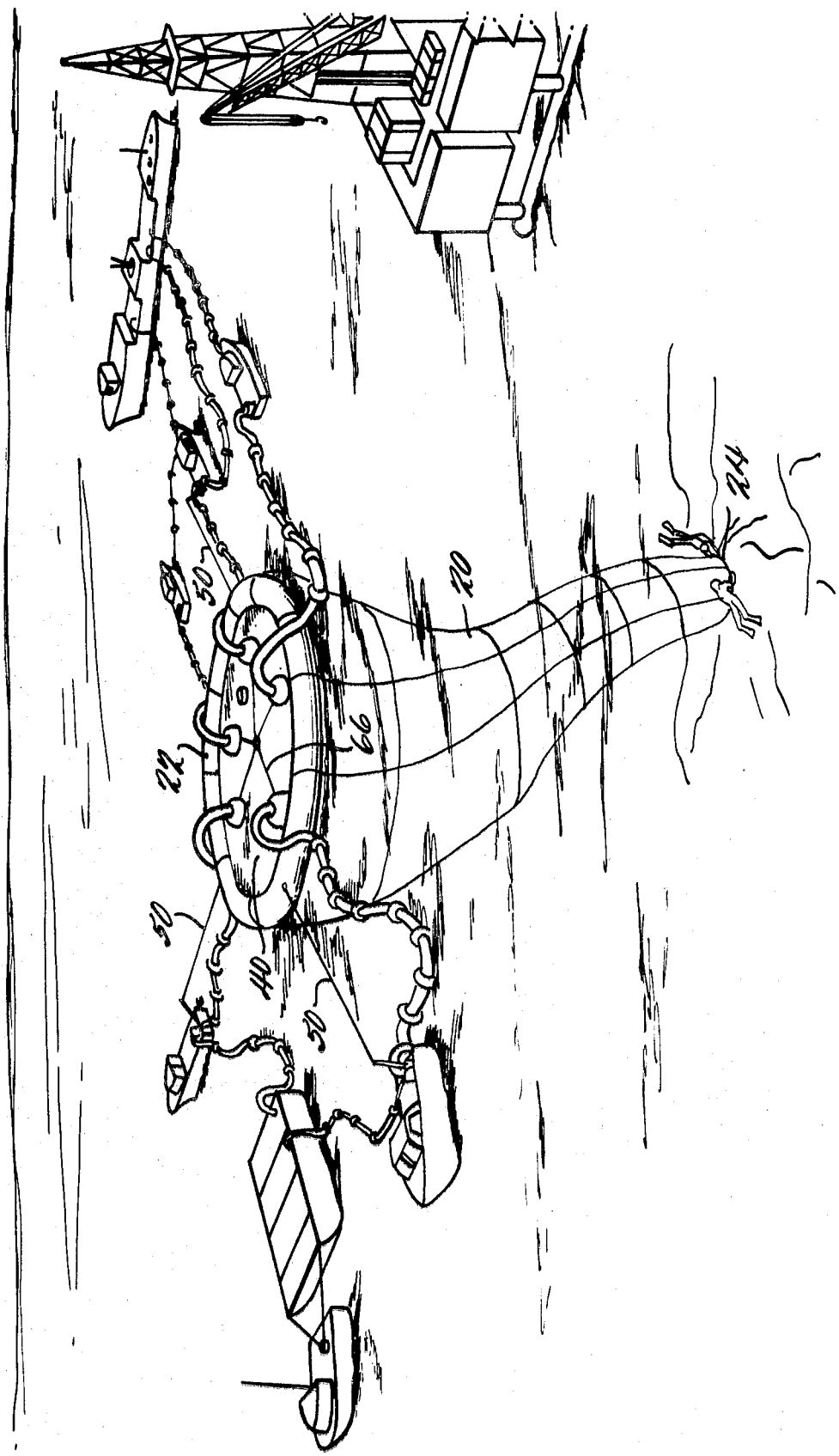
FIG. 1 shows the marine pollution control system <MPCS> of this invention during recovery of oil from a bottom or ocean floor spill. The single well production piping and casing have been cut and plugged by use of a pipe cutting and plugging machine described in the latter part of this specification. The shallow water drilling platform has hoisted the remaining piping and has moved away, and the <MPCS> team has completely confined the spill and eliminated the oil slick.
Figure 2:
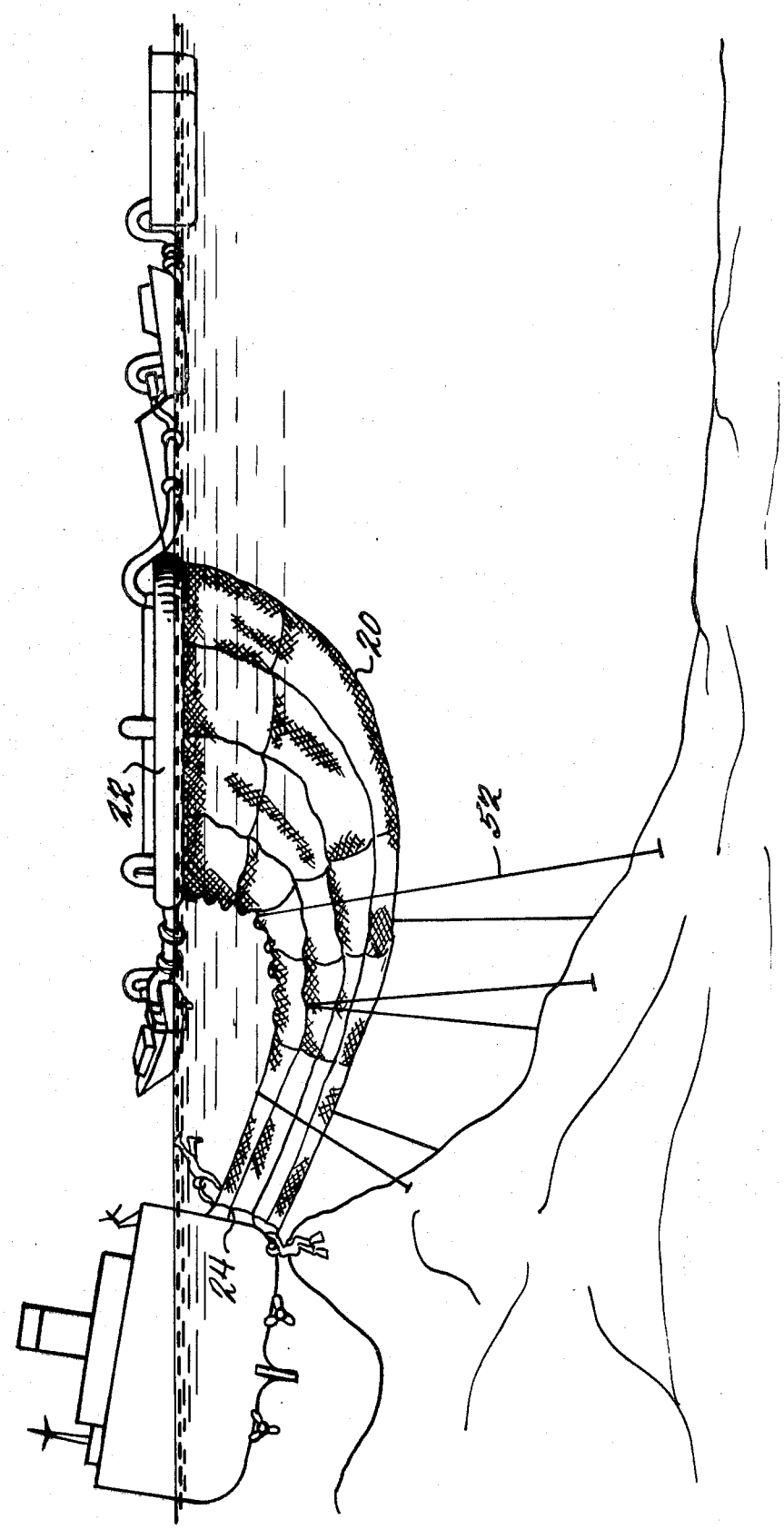
FIG. 2 shows the marine pollution control system of this invention as deployed for use in recovering oil from an opening in the hull of a tanker.

The Marine Pollution Control System illustrated in FIGS. 1 and 2 encompasses frogmen fitting the mouth of the bag 20 around the source of the oil spill, either at the bottom of the sea or on the ship's hull and in surveillance of bag 20 as it assumes its inverted tear-drop shape when filled with oil, and on look-out for abnormal conditions, pump suction hoses hooked up to quick-release connections on the bag's roof, high capacity positive displacement pumps, aboard pump boats, transferring oil from bag to receiving end, manned boats and pumps, and pump discharge hoses operating on receiving vessel or pipeline ashore with a team captain in direct, closed circuit, electronic communication with every member of the team, including frogmen, managing the over-all situation. A helicopter, also under the direction of the team captain would hover over the spill area for the purpose of assisting in the coordination of the salvage work and of rescuing personnel or equipment should the need arise during the operation. Fire fighting equipment of the chemical type will be provided aboard each boat to guard against the possibility of fire hazard, and a self-contained bag roof $CO_2$ topping system will be provided on the roof to protect the bag from waterborne slick fires.

Thus, the services of the system can be marketed among oil companies or government agencies in the U.S. and abroad for use as an oil pollution control preventive measure as well as a contingency measure. As a preventive measure, it can be kept in readiness in areas of offshore drilling operations, in tanker traffic focal points, and aboard tankers themselves. In offshore fields susceptible to spills, bags with modified roofs can be used to envelop wells, from the platform on the surface to the ocean floor. As a contingency measure it can be used after an oil spill has occurred from a well, tanker, pipeline or ocean floor crevice.

In its basic form, the system contemplates the use of a flexible bag 20 to receive and confine a fluid flow so as to prevent pollution of a water environment from the fluid flow. FIGS. 1 and 2 show the flexible bag means 20 deployed and installed to receive oil flowing from such underwater sources as a fissure in the ocean floor (FIG. 1) or a leak in an oil tanker (FIG. 2). The flexible bag means shown in FIGS. 3 – 7 is built of plastic with nylon fabric insert over a net like hi-tensile nylon structure. This structure includes a roof ring 22 and a mouth ring 24, all of these forming an integral, one piece flexible structure. Around the mouth ring 24, there are attached to extensions of the bag vertical structural straps 26, and forming an integral part of the bag, a number of self-contained electromagnetic anchor blocks 28 which can be magnetically mounted either on separate anchors 30 which are adequately distributed around an offending crevice on the ocean floor or on the metal hull of a ship or other structure. The purpose of the electromagnetic anchor blocks 28 is to permit placing and shaping of the mouth rapidly around a crevice or opening, an anchor at a time, for each of handling. After all anchor points have been secured magnetically, and upon inspection of the mouth posture showing that it is correct, mouth ring 24 is separately activated either magnetically or by heavy liquid to seal the mouth around the spill. The anchor blocks 28 are then tied with steel cables to the anchors 30 for indefinite attachment.

When the spill originates from a leak around an oil producing well, its casing and tubes 32 are cut and plugged a few feet from the bottom of the ocean as described later in this specification and the bag placed over the plugged well tubing for recovery as shown in FIGS. 1 and 5.

When the spill originates from a tanker or pipeline the procedure and operation are similar except that the separate anchors 30 are not used. The anchor blocks 28 are attached directly on the ship's hull or pipeline and the mouth ring 24 of the bag is energized for securing to the hull or pipeline. The mouth ring 24 is designed to form a seal around the crevice or crack to effectively prevent oil seepage under the mouth and outside the bag. Mouth rings 24 are of two types: heavy liquid filled and electromagnetic type. The heavy liquid mouth is used for oil recovery from the bottom of the sea and as such the ring is manufactured of neoprene and filled with heavy liquid supplied from a self-contained flexible tank integral to the roof. Heavy liquid flows into the ring through flexible polyvinylchloride (PVC) tubing running the length of the bag and forming an integral part of the bag. The electromagnetic mouth type is used for recovery from a broken tanker or pipelines. In this type, the ring is made of multiple electromagnets in succession forming a flexible ring structure that assumes the shape of the surface of attachment. This electromagnetic ring is energized, as is known in the art, by a self-contained waterproof dry power source (not shown) that is part of the mouth. After placing the mouth, and when control of the salvage situation has been accomplished, power for the electromagnetic mouth ring may come from shipboard equipment, for sustained attachment, but the self-contained power source is designed for a minimum capacity of 24 hours.

As shown in FIG. 4, roof section 40, like the body of the flexible bag, is also made of plastic with nylon insert, but of heavier grade, in order to permit frogmen to walk upon it and is bounded by ring 22. On the roof there are a number of nitrogen filled neoprene ringlets 42 which are automatically inflated from integral pressurized bottles activated by known means the moment the roof has touched the water. These ringlets house suction hose connections 44 together with hose male terminals 46 to form quick-release couplings for the roof section as shown in detail in FIG. 11. In addition to housing the couplings, ringlets 42 provide buoyancy to support the weight of hoses 48 and other attachments of the roof structure. Ring 22 around the periphery of the roof section is made of heavy duty neoprene, compartmented and automatically inflated upon contact with the water from self-contained nitrogen bottles. The impulse which causes roof ring 22 to become inflated also acts upon the ringlets 42 inflating mechanism so that all these will inflate simultaneously. Roof ring 22 also protects the bag and provides buoyancy for supporting its entire weight. The oil contained within the bag does not exert any downward pull due to its own buoyancy.

Attached to the periphery of roof ring 22 are several hi-tensile steel wire rope guys 50 handled from the pump boats with the purpose of maintaining the system on station without stressing suction hoses 48. Guys 50 are provided with reels and rattlers at the boats in order to allow for sudden pulls caused by sea conditions and to keep boat personnel alert. Operation of guys 50 is similar to a fishing line, rod and reel. Bags used for tanker spill containment are fitted with guys 52 around their bodies as shown in FIGS. 2 and 3 to allow shaping to keep the body of a bag underwater and preclude any damage should a shipboard fire occur. Reef points 54 are provided on bottom containment bags in order to take in bag slack. A portion of the roof is provided with a see-through window or windows (not shown) to observe when oil has arrived at the top of the bag as a permissive sign for pumping.

Referring to FIG. 4, bell shaped stiff plastic telescopic skirts 60 are suspended from each suction assembly to eliminate the possibility of portions of the flexible bag's wall from plugging up hose connections. Skirts 60 will collapse along their axes when the bag is folded during storage and transit as well as for the purpose of achieving compactness. In addition, skirts are provided with a wire mesh screen 62 to prevent large suspended solids and other matter from entering the pumps. Check valves 64 are also provided on each suction assembly to keep oil in the bag until such time as the hose has been completely connected. Check valves 64, as shown in detail in FIG. 11, are pushed out of the flowstream automatically the moment the connection is made to allow oil transfer to continue.

A bursting diaphragm (not shown) is provided on the roof to protect the bag against overpressure.

Plastic coated steel cable 66 on the roof is provided to tie all hoses together and transmit and distribute forces evenly to allow the whole assembly to move as a unit and prevent strain on the roof due to uneven pull of the hoses.

As shown in FIGS. 3, 6 and 7, a throat section located several feet above mouth ring 24 is provided with a removable seal 70 to keep water from flooding the entire bag during its descent to a spill source and to allow only sufficient water to fill the mouth area to equalize hydrostatic pressure within and without the bag to shape the mouth area and facilitate positive mouth placing. Sealing of the throat section is accomplished by means of the removable throat seal shown in FIGS. 6 and 7, consisting of a clamp 72 and a plunger 74 which together restrain the bag, and effectively seal the bottom section from the top. Both clamp and plunger are made of hard extruded PVC and are flexible along their axis only. After the mouth has been secured through magnetic anchor blocks 28, removable seal 70 is released by a frogman by removing the plunger and allowing the bag to break away from the clamp, hence, open up its body to the oil spill. At this time, and only after the seal has been released, heavy liquid (or electric power) is admitted into the mouth ring 24 to completely isolate the interior of the bag from the sea around it. At this moment, complete confinement and control of the spill has taken place for the first time.

An electronic homing system integrated into the <MPCS> communications equipment may be provided for bottom spill operations to keep the roof in correct position relative to the mouth and prevent bag distortion. This involves an independent self-contained, waterproof transmitter positioned by a frogman on the bottom at the mouth. The team captain "homes" to the signal of this underwater transmitter and coordinates all pump boats to maintain station. Receiving vessels or barges would also maintain their stations relative to the pump boats.

Flexible bag 20 can be manufactured in different sizes and lengths to suit particular parameter of the spill at hand. Oil field locations, field well density, shipping routes an other statistics will be analyzed in forecasting types and sizes of bags to be manufactured for stockpiling. Information relative to type of spill, depth of water, sea conditions, sea bottom conditions, water temperature, etc., would be immediately taken into consideration upon selecting the size and type of bags to be shipped to the site. A conservative stand would then be taken on bag selection in order to ship bags to the site with lengths relatively longer than the prevailing or actual maximum depth of water. Should the length of the bag be too long, then the bag can be shortened by the use of reef points 54 provided along its external wall.

As discussed earlier, a number of bag anchor assemblies shall be securely located around the spill source thence holding the bag mouth in position during the oil containment and recovery operations. FIG. 8 shows the two major elements which constitute a single anchor assembly in the prepared condition. The first element — electromagnetic anchor block 28 — is integrally attached to the bag structure through extensions of the bag structural vertical straps. Block 28 consists of a cylindrical steel casing 80 completely sealed and further encased with plastic coating 82 for the purpose of thoroughly insuring desired water tightness. Inside casing 80 are a dry battery 84 (diagramatically illustrated) and an electromagnetic coil 86 connected together via a totally encapsulated switch 88 whose function is to close the circuit. When coil 86 is energized, the magnetic field is set-up, and block 28 can be attached to either an anchor plate 90 or any other ferritic surface such as a ship's hull or pipeline. A battery charging connector 90 is provided to keep the battery at full charge while the bag is stored ready for use. Both coil and battery are sized to provide adequate electromagnetic force for anchor attachment for a period of 4 hours minimum.

In the event of oil spill emanating from a tanker, frogmen will place anchor blocks 8 on the ship's hull one at a time in order to insure the mouth posture is adequate around the hull crack. Once this is done the electromagnetic mouth ring 24 is energized becoming in itself the bag anchor which holds the mouth in position indefinitely while simultaneously sealing the oil inside the bag.

For sea bottom recovery on the other hand, separate anchors 30 are driven into the bottom around the crevice by frogmen, and the anchor blocks 28 then placed on plate 90 of anchors 30 and then energized. After the mouth posture is ascertained to be correct and securely in place, mouth ring 24 is filled with heavy liquid an steel rope 96 is tied to the anchor latch hooks 98 for the final attachment.

The second element of the anchor assembly of FIG. 8 comprises a separate anchor 30 made of stainless steel of rugged construction except for its anchor plate 90 which is ferritic steel. When an encapsulated explosive charge 100 is activated through a detonator 102, the force of the expending gases drives a telescopic anchor shank 104 with great force into the sea bottom where it becomes completely extended in a penetration of the ocean bottom of approximately three feet. Clearances between telescoping tubular sections 106 are tight as shown in FIG. 9 and lubricated, giving a snug fit in order to prevent entrance of water into the explosion cavity, and the explosive charge 106 is encapsulated to retain explosive stability should a leak occur. A rebatable arm 108 is shaped as a conventional anchor with a fluke, as shown in FIG. 10 to prevent pull out.

The number of anchor blocks 28 utilized are dependent on the bag size. A bag for ship recovery, for instance, with a ten foot diameter mouth would have as many as eight to ten electromagnetic anchor blocks. The number of separate anchors 30 for sea bottom recovery is approximately 20 percent higher than the number of anchor blocks provided in order that sufficient spares are available. Anchors and all other appurtenances associated with mouth placing are attached to the mouth for travel to the bottom. Once the mouth touches bottom frogmen retrieve anchors 30 and homing device, and the mouth placing sequence ensues.

A hose "quick-release coupling — check valve" shown in FIG. 11 permits fast hose connect and disconnect operations on the roof section of flexible bag 20, and prevents oil spillage from the hoses when they are disconnected. A male section 110 is inserted into the female section 112 (also see FIG. 4) and tightly sealed therein by the action of cam arms 114 which press the male section 112 against the female soft seat gasket 116. This portion of the quick release coupling is commonly used in the piping industry, and is not a part of my invention. FIG. 11 shows the coupling in the ready position where the male tubular extension 118 has pushed a lower check valve 120 out of the way. The female section rim has likewise opened an upper check valve 122 by pushing geared lever arm 154. Lever arm 154 protrudes perpendicularly from male section 110 when check valve 122 is closed, and slides over the rim when the coupling is made to open the valve as shown.

The two check valves 120 and 122 are identical in construction and consist of a stainless steel sheet disk of adequate gauge to provide stiffness when the valve is in a closed position and to bend around the contour of the pipe when in the "open" position. The disk is attached to stiffening arms 126 and 128 of stainless steel. Arm 126 is solid, spring loaded, and pivots around its end to close the check valve against soft gasket 116 when the coupling is released. The motive force that closes the check valve is provided by spring 130 and by the pressure of the oil contained within the hose. Crossarm 128 is sectioned as shown in FIG. 12 to provide stiffness to the disk when the valve is on the "closed" position and to bend when check valve 122 is lodged in the recessed portion of the pipe. The direction of flow is from the female to the male end, and under this condition, the check valves are out of the flow stream, minimizing the friction loss through the coupling. Pump discharge hose check valves are designed with higher structural strength than pump suction hose check valves in order that they will be able to withstand pump discharge pressures (for several minutes) when pumps are running in the event of an accidental disconnect. This higher structural strength on discharge check valves is obtained by the smaller diameter of the discharge hoses, by designing the disks of thicker gauge and by providing one or more cross-arms to the valve disks.

Hoses are connected to the couplings through conventional hose terminals 132 and clamps 134 as shown in FIG. 11. The "quick-release coupling" sections are manufactured of light weight die-cast aluminum alloy and hardened at check valve and cam arm pivots.

In the practice of the method of this invention, the team, if not already in the area, would arrive at the spill site as soon as practicable after the spill has occurred and before it has developed into a slick of serious proportions. <MPCS> personnel and equipment will be dispatched by air to the spill area for immediate containment. Bags, pumps, hoses, communication equipment, auxiliary equipment, etc., are designed for air transport and for rapid mounting aboard motor boats which are procured at the spill area during the time the containment team is in transit to the site.

The system is organized as a compact, well coordinated and highly mobile combination of men and equipment that can be dispatched immediately for oil spill containment and control services anywhere in the world. The team shall consist of a team captain, bag boat personnel, pump boat captains, pump operators, frogmen, oil transfer personnel, and helicopter crew; all well trained into a highly efficient team capable of putting any difficult situation under control immediately after arrival at the disaster site. While the containment team and their equipment are in transit, preparations will progress at the site for the procurement of motor boats and for securing conditions to insure fast and complete control of the oil spill. Pump and bag boat types and sizes shall be selected in accordance with sea and weather conditions prevailing at the disaster area. Small craft in the 40-foot range would be utilized for calm seas and larger craft for heavier seas. In the event of a spill on the high seas, all men and equipment would operate from seagoing vessels.

The team shall take full advantage of the assistance and support of government agencies community and cooperative salvage teams. Fire departments, police departments and the Coast Guard, for instance, would assist in the security, transport and procurement phases of the salvage effort. The spill containment and control work itself, however, would be performed exclusively by the team due to the highly specialized training and nature of the work requiring these highly trained personnel.

A description of the events culminating in the situation shown in FIG. 1 is as follows. Oil is reported spilling from around the producing well. Depth of water, water temperature, sea state, weather conditions, estimated rate of oil spill, availability of small craft, and other pertinent information are reported in addition to the geographical location of the oil spilling well.

The team, on the basis of the above information, selects bag (or bags), equipment, and men to be shipped by air or by the most expeditious means to the spill site.

While the team travels to the site, bag boat, pump boats, command boat, recovery barges or tanker(s), transport helicopters, etc., are procured for the salvage operation locally either by representatives of the system or by local agencies through closed circuit emergency communications network.

Next, the team arrives at the local airport or staging area. Pumps, hoses, communications console and equipment, bag (or bags), and men are assembled and helicopter lifted to the boats already on station awaiting for the equipment and men.

The team assumes command of all boats for the operation; closed circuit communications are established, and the bag boat approaches the spill area and drops the bag mouth into the water. Pumps are mounted and readied on pump boats, and pump discharge hoses are hooked up to receiving barges or a tanker, and pump boats assume their assigned stations.

Frogmen will have pulled the bag mouth to the bottom of the sea and will have started the pipe cutting and plugging operation while the mouth rests on the bottom on "stand-by" for subsequent positioning over the leak.

The bag roof is dropped on the water and the roof ring is inflated. Pump boat personnel hand suction hose lead section to frogmen and as frogmen pull the hose toward the bag roof, the pump boat personnel continue hose section hook-up until the lead section is connected to the bag's roof suction connection. The pump boat personnel inflate hose floats by puncturing nitrogen bottles as hose sections are released on the water.

The frogmen finish the pipe cutting and plugging operation, and then place the bag mouth around the spill source over the well piping stub. The drilling platform moves away from the area after the above operations are completed.

The throat seal of the bag is next released manually by a frogman.

Hose hook-up continues at the surface, and the team captain keeps bag roof and team on station by homing to signal from bag-mouth transmitter; a helicopter hovers overhead to assist in operation.

Heavier than water liquid is pumped into the mouth seal ring and oil is confined in the bag for the first time.

All hoses are now hooked up and secured.

As oil enters the bag, frogmen conduct bag surveillance as oil flows upwards, and oil reaches the bag's roof.

Pumps are started on boats, and suction and discharge hoses are primed to begin transfer of oil from the bag to the receiving barge or tanker.

Complete pollution control has been accomplished in a matter of hours.

The operations described above and shown in FIG. 1 are equally applicable to spills from deep oil wells with permanent, multi-well platforms, to pipelines or to seepage from bottom crevices.

Oil is recovered from a spilling tanker by placing the <MPCS> bag directly on the tanker's hull and then pumping the confined oil, as described earlier, from the bag to the receiving tanker or barge.

Hydrostatic pressure is overcome and oil flow from the tanker into the bag is insured by lightly pressurizing the ship's hull with an air bubble. This air bubble is pumped into the oil bunker with the use of a self-contained air compressor that delivers air through a hose and a tap drilled on deck or on a bulkhead for this purpose. This air compressor as well as other equipment is delivered to the disabled tanker by helicopter.

The operations resulting in the complete oil spill recovery shown in FIG. 2 are similar to those described earlier for a bottom recovery except that in this case, the mouth is anchored and sealed directly on the ship's hull electromagnetically and the bag assumes a bent tear-drop shape.

This bent shape is required for two reasons. First, to keep the body of the bag underwater and the roof as far away as possible from the tanker in order to permit spill recovery even in the event the tanker is afire, and, second, to permit smooth oil flow from the tanker through the body of the bag to the roof and out through the pumping system to storage. Bag shaping is accomplished by proper roof location and by pulling down the body by the use of shaping guys attached to the bag and anchored on the bottom.

Examples of the manufacture and material for various components of the system of this invention are itemized below with reference to he drawings:

FIG. 3:
Bag structure — High tensile nylon straps
Bag Wall — plastic with nylon fabric insert
Mouth seal ring — neoprene, filled with heavy liquid, compartmented.
Electromagnetic anchor block, integral with bag, powered from self contained batteries — Steel casing, encased in plastic
Bag anchor — Stainless steel, telescopic, shot into the ground by explosive charge
Oil production line, casing, etc.
Roof ring — heavy duty neoprene, compartmented, inflated from self-contained nitrogen bottles
Roof — plastic with nylon insert over nylon structure
Hose connection ringlet, neoprene, compartmented, inflated from self-contained nitrogen bottles
Roof suction coupling, female section — die cast aluminum alloy
Hose coupling, male section — die cast aluminum alloy
Hose — heavy duty plastic over nylon with steel wire armour
Check valve — stainless steel
Suction intake skirt — hard PVC, telescopic type
Suction screen strainer — steel wire mesh
Hose float — neoprene, nitrogen inflated from self-contained bottles
Steel cable, plastic coated. Transmits and distributed forces of hoses
Reef points — nylon rope; used to shorten bag
Guys — nylon rope; used to shape bag by pulling
Throat. Water does not enter beyond this line until a seal is released
Steading guy — steel rope, plastic coated FIGS. 6 and 7:
Plunger — hard extruded PVC, flexible along longitudinal axis
CLamp — hard extruded PVC, flexible along longitudinal axis
FIGS. 8 – 10:
These are two separate units, but shown in the condition of attachment.
Electromagnetic anchor block. Powered by self-contained
battery. Integral with bag. — steel casing, plastic coated Bag anchor — stainless steel, telescopic, shot into the ground by explosive charge
Plastic envelope for watertightness
Casing — steel
Dry battery compartment
Coil, encapsulated
Switch, encapsulated for watertightness
Battery charger plug
Seal for watertightness
Anchor plate — steel
Shank — steel
Rebatable arm — steel
Telescopic sections, snug fitting for watertightness — steel
Latch hook
steel rope for permanent attachment of block to anchor
Explosive charge, encapsulated for water tightness
Detonator
Plunger mechanism to detonate explosive charge
FIGS. 11 and 12:
Male section — die cast aluminum alloy
Female section — die cast aluminum alloy
Coupling gasket — neoprene
Male section extension
Check valve — stainless steel
Check valve arm — stainless steel bar
Check valve cross arm — sectioned stainless steel bar
Spring — stainless steel
Lever arm to open male section check valve — stainless steel
Check valve seat neoprene
Quick coupling cam arm. This is not claimed as my own invention; it is widely used in the piping industry and it is not known to me if a patent covers it.
Arm catch — spring loaded roller — stainless steel
Nipple hose terminal
Hose clamp — stainless steel
FIGS. 13 – 16:
Motor, 120 Vac. 60 Hz, submersible encapsulated, water cooled
Slurry pump casing
Perforator blade — hardened stellited stainless steel
Flexible shaft — stainless steel
Rigid shaft — stainless steel
Suction tube — flexible stainless steel
Discharge tube — flexible stainless steel
Suction screen — stainless steel wire mesh
Power supply cable, grounded, waterproof, steel armour; also supports weight of sand remover assembly
Watertight seal
Flexible shaft support — stainless steel
Shaft bushing — bronze
Motor shaft packing. Motor shaft is grooved as an impeller on the water side to keep water away from packing when pump is in operation.
Pump — motor coupling; heavy duty, high torque, solid rubber, marine type
Slurry pump impeller
FIGS. 17 – 29:
Clamp — one-half inch aluminum alloy
Swivel stud bolt — three-fourths inch diameter continuous thread, ASTM A 193 GR. B7; Hex. nut ASTM A 194 GR. 2H
Hinge pin — stainless steel
Structural arms — aluminum alloy
Driving raceway ring — stainless steel
Driver shaft bearing groove — stainless steel
Motor assembly driving pinion — stainless steel
Driving gear — stainless steel
Stabilizing stop plate — brass
Stabilizing raceway ring — stainless steel
Motor assembly ball stop — stainless steel
Stabilizing stop plate — brass
Plenum chamber
Pressure tube — one-fourth inch × .049 stainless steel
Pressure tube cap — stainless steel foil
Gap seal strips — stainless steel foil
Cover arm structure — steel
Cover arm — steel barstock
Cover arm extension — steel barstock
Cover arm spring — steel
Cover arm guide and lever pivot point
Plpe cover — steel disk, teflon seat
Lever action plug spring housing cylinder — steel
Lever action plug spring — steel
Lever action plug trip mechanism — stainless steel
Lever action pressure rebatable fork — steel
Lever action pressure rod — stainless steel
Lever action pressure nut — stainless steel
Lever action spring arming plate — steel
Motor and battery casing — aluminum alloy
DC motor submersible encapsulated, water proof, water cooled
Dry battery compartment
Motor shaft — stainless steel
Driver shaft — stainless steel
Speed reducing gear box — self lubricated
Shaft bearing — brass (Typ.)
Motor — battery assembly shaft seal. (Typ.)
Cutting disks driver gear — stainless steel
Cutting disks primary gears — stainless steel
Cutting disks driving chain — stainless steel
Cutting disks secondary gears — stainless steel
Cutting disks — hardened high speed steel alloy cutting edge.
Cutting arms — steel
Cutting pressure spring — steel
Pressure spring guide bar — steel
Explosive charge, encapsulated
Release arm cylinder — stainless steel
Release arms — steel
Open away spring — steel
Cover arm release mechanism diaphragm
Release Rod — steel
Cover arm trigger — stainless steel
Trigger mechanism guide — stainless steel
Lever action displacement slot
Cover arm stabilizing slot
Cover arm stop nut — one-half inch diameter Hex. nut, ASTM — A 194 GR 2H
Lever action spring arming plate key — steel
Lever action spring arming key slot Release rod stabilizing spring -steel
Trigger circuit dry power source, encapsulated
Wood spacer, impregnated with magnets, plastic coated,
color coded.

Hoses used to transfer oil from the <MPCS> bag to the recovery station are made of axially collapsible, high tensile plastic with nylon insert and spiral type stainless steel wire armour embedded in the hose material. The purpose of this design, is to achieve light weight and compactness to the maximum degree attainable. Hoses come in 20 to 40 foot lengths approximately. In order to handle the 1,000 GPM flow rate established for each pump, the suction hoses are of 12 inch in diameter and the discharge hoses are of 10 inch in diameter.

Each hose section is designed to weigh not more than what an average man can handle along with ease. Suction hoses are designed for partial vacuum, and discharge hoses for the maximum pumping pressures required. Recirculating pressure safety valves are provided around transfer pumps in order to protect discharge hoses from over pressure.

Hose sections are provided with quick-release connections and check valves at each end as shown in FIG. 11, in order to permit fast hook-up and to preclude further pollution by the spill of the contents in the event of a mishap or deliberate emergency, disconnect. Hose connections at the pumps are of a swivel type to permit pump boat maneuverability. Integral neoprene floats as shown in FIGS. 1 and 2 are inflated from self-contained nitrogen bottles, and are provided at convenient points along each hose section to provide buoyant support of hoses, and to clearly mark hose paths.

Transfer pumps are of the self priming, high capacity, positive displacement, light weight, rugged construction type. Pumps are capable of handling oils of wide viscosity range including crudes and refined products. Seawater, suspended solids, and air pockets are also handled without any detriment to the pumps.

Pumps are driven by diesel engine drives. Pump, coupling, and driver, are mounted on a common base plate forming a complete operable unit. This unit is light and compact and suitable for air transport, and for quick mounting aboard pump boats with the use of shipboard gear. Recirculating safety relief valves are provided around pumps in order to protect both pumps and discharge hoses from overpressure. Pump sizes depend on the capacity and head requirements at the spill site, but in no case, a pump should have less than 1,000 GPM capacity. As in the manufacture of bags, statistics and probabilities will be taken into account on deciding pump sizes to be stockpiled. Pumps are air lifted by helicopter from the arrival airport for delivery to the pump boats at the spill area.

For a tanker spill recovery and as previously described herein, an air bubble must be pumped into the disabled tanker's hold in order to first establish a small differential pressure that forces oil from the tanker, or hull crack, into the <MPCS> bag; and second, to keep the tanker afloat and allow shipboard damage control operations to proceed during the containment work. The air compressor used for this purpose is also compact, lightweight unit suitable for air transport to the arrival airport and flown by helicopter to the disabled tanker.

The air compressor consists of a diesel engine driver and a two stage, reciprocating, self-lubricated, sea water cooled compressor mounted on a common skid in a single package unit. Cooling water pump and hoses are integral with the compressor assembly. The compressor delivers air directly into the disabled hold through a discharge hose also integral with the compressor assembly.

Driven by the diesel engine driver shaft there is a 120 Vac. self excited generator capable of delivering power to several sand removers which may be used in conjunction with the <MPCS> salvage operation.

Although preferred embodiments and uses of the system of this invention have been described, it will be apparent to those skilled in this art that equivalent structures and uses may be substituted for those described. For example, the flexible bag may be used, in somewhat different applications, to temporarily store industrial or other wastes along waterways where such wastes are normally treated prior to dumping into water, but where there is a breakdown in treating equipment. The wastes may be stored and then recycled after equipment is repaired, or they may be received into the bag for transfer to other receptacles or vessels for storage or further treatment.

I claim:

1. An apparatus for receiving and confining a fluid flow from an underwater source so that the fluid can be collected with a minimum of loss into a surrounding water environment, said apparatus comprising:

a flexible bag means which can be deployed from the surface of a body of water to an area from which said fluid flow originates said flexible bag means comprising a hollow body form having (a) an open mouth for placement around the source of said fluid flow at an underwater level, said open mouth being defined by a flexible ring means which is sufficiently flexible to permit a shaping of said open mouth to fit a surface to which said open mouth is secured for receiving a fluid flow, and (b) a roof section which remains floating on the body of water for receiving and confining the fluid near the surface level of the body of water so that the fluid can be collected from beneath the roof section of the flexible bag means without loss of said fluid to surrounding water areas, said roof section being provided with a flexible, inflatable ring structure around its periphery to provide positive buoyancy for said roof section when the ring structure is inflated during deployment, and anchoring means secured to said flexible bag means for fastening said open mouth in a position to receive fluid flow issuing from said source, said anchoring means comprising a plurality of anchor block means which are separate from said open mouth and which can be energized to establish magnetic fields, thereby providing for an anchoring of the anchor block means directly to a ferritic surface such as a ship's hull, a pipeline, or other separate anchoring means.

2. The apparatus of claim 1 wherein said open mouth of said flexible bag means includes means for establishing a substantially sealed relationship between the periphery of said open mouth and a surface area surrounding said source of fluid flow.

3. The apparatus of claim 1 wherein said flexible bag means is shaped to include a hollow throat section adjacent to said open mouth, said throat means being provided with a removable seal means which closes off a major portion of the interior of the flexible bag means while the flexible bag is being initially deployed from the surface, to thereby prevent a flooding of said bag with water until deployment is completed and the seal means is removed.

4. The apparatus of claim 1 wherein said ring means is formed to receive a heavy liquid for ballasting the lower end of said flexible bag means to provide a substantially sealed relationship between the periphery of said open mouth and a surface area surrounding a source of fluid flow which is to be collected by said flexible bag means.

5. The apparatus of claim 1 wherein said flexible ring means of said open mouth includes electromagnetic means for attaching the periphery of said open mouth, in a substantially sealed relationship, with a wall surface of a vessel or pipeline from which a fluid flow is to be collected by said flexible bag means.

6. The apparatus of claim 1 wherein said roof section is provided with hose connection means for securing suction hoses through the roof section so as to receive collected fluid from the interior space beneath the roof section, said suction hoses being in flow communication with pumping means which draw fluid from the flexible bag means to a separate collection vessel or station.

7. The apparatus of claim 6 and including additional inflatable ring structures at the locations of each of said hose connection means so as to provide additional buoyancy for said roof section at said locations where suction hoses are secured thereto.

8. The apparatus of claim 7 wherein each hose connection means is provided with a check-valve means for normally sealing openings associated therewith until such time as suction hoses are secured through said roof section.

9. The apparatus of claim 8 wherein said hose connection means are evenly distributed in horizontally spaced positions through said roof section and load distribution cables secured between suction hoses secured to the hose connection means, thereby relieving uneven strains on said roof section.

10. The apparatus of claim 6, wherein said roof section is maintained in a preferred station on the surface of a body of water with guy cables extending outwardly from the roof section for being held by to boats.

11. An apparatus for receiving and confining a fluid flow so as to prevent pollution of a water environment from said fluid flow, said apparatus comprising:
a flexible bag means which can be deployed onto the surface of a body of water and extended from a surface area to a source of said fluid flow so as to receive and confine the fluid flow within an interior space of the bag, said flexible bag means being in the form of an elongated hollow body having (a) an open mouth at one end for receiving said fluid flow at its source, (b) a substantially closed roof section at an opposite end which remains floating on the surface of said body of water, and (c) a hollow throat section located between said open mouth and said roof section, removable seal means constructed and arranged to close said throat section, thereby providing for a deployment of the flexible bag means in a collapsed condition and with no substantial flooding of the interior space of the flexible bag means until deployment has been completed to receive fluid flow into the open mouth thereof and the seal means has been removed.

12. The apparatus of claim 11 wherein said roof section of said flexible bag means is completely closed and sealed except for aperture means formed therethrough to receive suction hose means which function to draw off fluid flow received and confined within the flexible bag means.

13. The apparatus of claim 11 wherein said seal means comprises an elongated plunger means and an elongated clamp means which mates with the plunger means, said plunger means and clamp means each being of sufficient length to extend across the width of said throat section when the flexible bag means is in a collapsed condition so as to form a seal across said throat section when the plunger means is placed against one outside surface of the throat section and the clamp means is pressed against an opposite outside surface of the throat section to thereby squeeze the throat section therebetween as the plunger means is mated with the clamp means.

14. The apparatus of claim 11 wherein said open mouth is defined by a flexible ring means carried by said flexible bag means.

15. The apparatus of claim 11 wherein said flexible bag means carries a plurality of anchor block means which can be energized to establish magnetic fields, thereby providing for an anchoring of the anchor block means directly to a ferritic surface such as a ship's hull, a pipeline, or separate anchoring means.

16. The apparatus of claim 1, and including separate anchoring means which can be secured in spaced positions around a source of said fluid flow so as to receive said anchor block means and to thereby fasten said open mouth in a position to receive said fluid flow issuing from said source.

17. The apparatus of claim 11, and including means for fixedly holding the shape of underwater portions of said flexible bag means when in its deployed condition.

18. A method for receiving and confining a fluid flow issuing from an underwater source with a flexible bag means having (a) an open mouth at one end for receiving said fluid flow at its source, (b) a substantially closed roof section at an opposite end which remains floating on the surface of said body of water, and (c) a hollow throat section located between said open mouth and said roof section and a removable seal means constructed and arranged to close said throat section, comprising the steps of:
deploying said flexible bag means with said removable seal means in place onto a surface area of the body of water in which said fluid flow exists,
extending an open mouth of the flexible bag means to an underwater location in the vicinity of said source of underwater fluid flow while maintaining a roof section of the flexible bag means in a floating condition on the surface of the body of water whereby said seal means substantially prevents water from entering into said bag,
removing said seal means, anchoring the open mouth of said flexible bag means in a position to receive fluid flowing from said source, sealing the periphery of the open mouth of said flexible bag means into a substantially sealed relationship with a surface area surrounding said underwater source of fluid flow, and receiving fluid flow from said underwater source into the interior of said flexible bag so as to confine the fluid therein.

19. The method of claim 18 wherein said flexible bag means is deployed in a substantially collapsed condition, and including a step of maintaining the flexible bag means in a substantially collapsed, unfilled condition until the open mouth is anchored into a position for receiving said fluid flow.

20. The method of claim 18 wherein said step of anchoring further comprises the steps of placing anchoring means in spaced positions around said underwater source of fluid flow, and securing anchor block means carried by the flexible bag means to said anchoring means.

21. The method of claim 18 wherein said step of deploying includes a step of inflating buoyancy ring means carried by said roof section to cause said roof section to remain floating while a lower portion of the flexible bag means is extended to the source of fluid flow.

22. The method of claim 18, and including a step of collecting fluid which is confined within said flexible bag means.

23. The method of claim 22 wherein said step of collecting is carried out by pumping confined fluid through said roof section and into a receiver by means of hoses and associated pumping devices.

24. The method of claim 18 wherein said fluid flow is issuing from a ship or other vessel, and including a step of pressurizing the fluid contents of the ship or vessel to create a pressure differential sufficient to cause the fluid contents to flow into the mouth of said flexible bag means.

25. The method of claim 18 wherein said step of deploying takes place at an offshore drilling platform site to confine oil spills around the drilling platform.

26. The method of claim 18 and including a step of maintaining the deployed flexible bag means in a preferred location with homing devices placed at said source of said fluid flow.

* * * * *